US006374492B1

(12) United States Patent
Myung et al.

(10) Patent No.: US 6,374,492 B1
(45) Date of Patent: Apr. 23, 2002

(54) METHOD FOR ASSEMBLING AN OUTDOOR UNIT OF A DUAL-UNIT TYPE AIR CONDITIONER

(75) Inventors: Doo-nam Myung; Hong-rae Kim, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/944,368

(22) Filed: Sep. 4, 2001

Related U.S. Application Data

(62) Division of application No. 09/261,495, filed on Mar. 3, 1999, now Pat. No. 6,301,778.

(30) Foreign Application Priority Data

May 22, 1998 (KR) .............................. 98-18586
May 15, 1998 (KR) .............................. 98-17702

(51) Int. Cl.[7] ................................ B23P 15/26
(52) U.S. Cl. ..................... 29/890.03; 29/890.035; 29/705; 29/822; 29/823
(58) Field of Search ................ 29/890.03, 890.035, 29/705, 822, 823, 824; 53/589; 414/391, 392, 393, 396, 609, 626; 198/468.4, 468.9

(56) References Cited

U.S. PATENT DOCUMENTS 3,684,073 A   8/1972   Giles
4,039,367 A   8/1977   Warshaw et al.
4,393,969 A   7/1983   Woell
4,783,904 A   11/1988  Kimura
5,069,598 A   12/1991  Kleinhen et al.
5,460,391 A   10/1995  Gantz et al.
5,715,692 A   2/1998   Pappas
6,038,521 A   3/2000   Kanai

FOREIGN PATENT DOCUMENTS

SU   825 454    5/1981
SU   130 2110   4/1987
SU   156 0930   4/1990
SU   159 3881   9/1990

*Primary Examiner*—I Cuda-Rosenbaum
(74) *Attorney, Agent, or Firm*—Burns, Doane, Swecker & Mathis, L.L.P.

(57) ABSTRACT

An assembly system and method thereof for manufacturing an outdoor unit of a dual-unit type air conditioner employs an assembly system in which the outdoor unit is assembled, a refrigerant charging section in which the assembled outdoor unit is charged with a refrigerant, a testing section in which the outdoor unit charged with the refrigerant is tested, and a packaging section in which the outdoor unit after passing the test in the testing section is packaged and forwarded. The outdoor unit is carried on a mobile cart through the assembly section, the refrigerant charging section, and the testing section.

10 Claims, 13 Drawing Sheets

METHOD FOR ASSEMBLING AN OUTDOOR UNIT OF A DUAL-UNIT TYPE AIR CONDITIONER

This application is a divisional of application Ser. No. 09/261,495, filed on Mar. 3, 1999, now U.S. Pat. No. 6,301,778.

BACKGROUND OF THE INVENTION

1. Field of the Invention

The present invention relates to a system and method for assembling an outdoor unit of a dual-unit type air conditioner.

2. Description of the Prior Art

Generally, an outdoor unit of an air conditioner is fully assembled in one place after parts thereof such as a compressor, a condenser, a fan, and the like are separately assembled at other places.

Conventionally, a linear assembly line has been employed to assemble the outdoor unit of an air conditioner.

Such a linear assembly line employs an assembly method in which a plurality of workers are aligned along a conveyor line and assemble the respective parts of the air conditioner in subsequent order. Consequently, the worker share of work is fully diversified.

In such a conventional linear conveyor line system, the productivity can be greatly improved by the fully skilled workers. Accordingly, it is preferable that a product of one kind be mass-produced by the conventional conveyor line system.

In this society which is fully diversified and globalized, however, the demands of the purchasers are diversified. To meet such various demands of the purchasers, a system for producing variations of products in small quantities is required.

With the conventional linear conveyor line system, however, the manufacturer has to frequently vary the assembly systems if he wants to produce products in small quantities, or the assembly system itself has to be altered. Accordingly, more time and money must be invested therefore, and productivity is less when considering the substantial amount of investments.

In addition, once the assembly system is altered, since it is impossible to produce the products of previous kind, the flexibility in manufacturing is also deteriorated.

SUMMARY OF THE INVENTION

The present invention has been made to overcome above-mentioned problems, and accordingly, it is an object of the present invention to provide a system for assembling an outdoor unit of a dual-type air conditioner, capable of flexibly varying the kind of product it produces and meeting the various demands of the purchasers.

Another object of the present invention is to provide a method for assembling an outdoor unit of a dual-type air conditioner, utilizing the assembly system of the present invention.

Above object is accomplished by an assembly system according to the present invention having an assembly section in which an outdoor unit is assembled, a refrigerant charging section in which the outdoor unit is charged with a refrigerant, a testing section in which the outdoor unit charged with the refrigerant is tested, and a packaging section in which the outdoor unit passed the testing section is packaged and forwarded, wherein the outdoor unit is loaded on a cart when conveyed.

The assembly section has a guide rail for guiding the cart, and a kit-box input/output means for supplying/withdrawing a kit-box to/from the carts conveyed along the guide rail.

The refrigerant charging section has a vacuum pump for vacuumizing an interior of the outdoor unit, and a refrigerant charger for charging the refrigerant into the outdoor unit vacuumized by the vacuum pump.

The testing section has a dummy unit for measuring a performance of the outdoor unit by being connected to the outdoor unit, and a display for displaying a result detected by the dummy unit.

Here, it is preferable that the vacuum pump of the refrigerant charging section and dummy unit of the testing section are respectively at least two.

The packaging section has a final assembly part in which the outdoor unit conveyed from the testing section is finally assembled, a packaging part in which the fully assembled outdoor unit is packaged, and a conveying part in which the outdoor unit assembled in the final assembly part is conveyed from the cart to the packaging part.

Another object of the present invention is accomplished by an assembly method of the present invention including the steps of (A) assembling the outdoor unit on the moving cart, (B) charging the refrigerant into the fully assembled outdoor unit, (C) testing the outdoor unit finished the step (B), and (D) packaging and forwarding the outdoor unit finished the step (C).

The step (A) has the sub-steps of (A1) assembling a frame and a compressor, (A2) inputting the cart to the guide rail, (A3) fixing a fan to the outdoor unit, (A4) fixing a condenser to the outdoor unit, (A5) welding the condenser with a capillary tube and performing a nitrogen test, and (A6) withdrawing the cart from the guide rail.

The step (B) includes the sub-steps of (B1) connecting the outdoor unit with a vacuum pump, (B2) operating the vacuum pump, (B3) disconnecting the outdoor unit from the vacuum pump, (B4) connecting the outdoor unit with the refrigerant charger, (B5) operating the refrigerant charger, and (B6) disconnecting the outdoor unit from the refrigerant charger.

The step (C) includes the sub-steps of (C1) connecting the outdoor unit with the dummy unit, (C2) operating the dummy unit, (C3) selecting the switch of the switching device corresponding to the outdoor unit whose detected result needs to be displayed on the display, (C4) determining the acceptability of the outdoor unit through the measured results displayed on the display, and (C5) disconnecting the outdoor unit from the dummy unit.

The step (D) includes the sub-steps of (D1) conveying the outdoor unit from the cart to the packaging part, (D2) encasing the outdoor unit with the packaging box, (D3) taping the packaged box of the outdoor unit, and (D4) forwarding the fully packaged outdoor unit.

BRIEF DESCRIPTION OF THE DRAWINGS

The above object and advantages will be more apparent by describing preferred embodiment in greater detail with reference to the drawings accompanied, in which.

DETAILED DESCRIPTION OF THE PREFERRED EMBODIMENT

Construction

Figure 1:
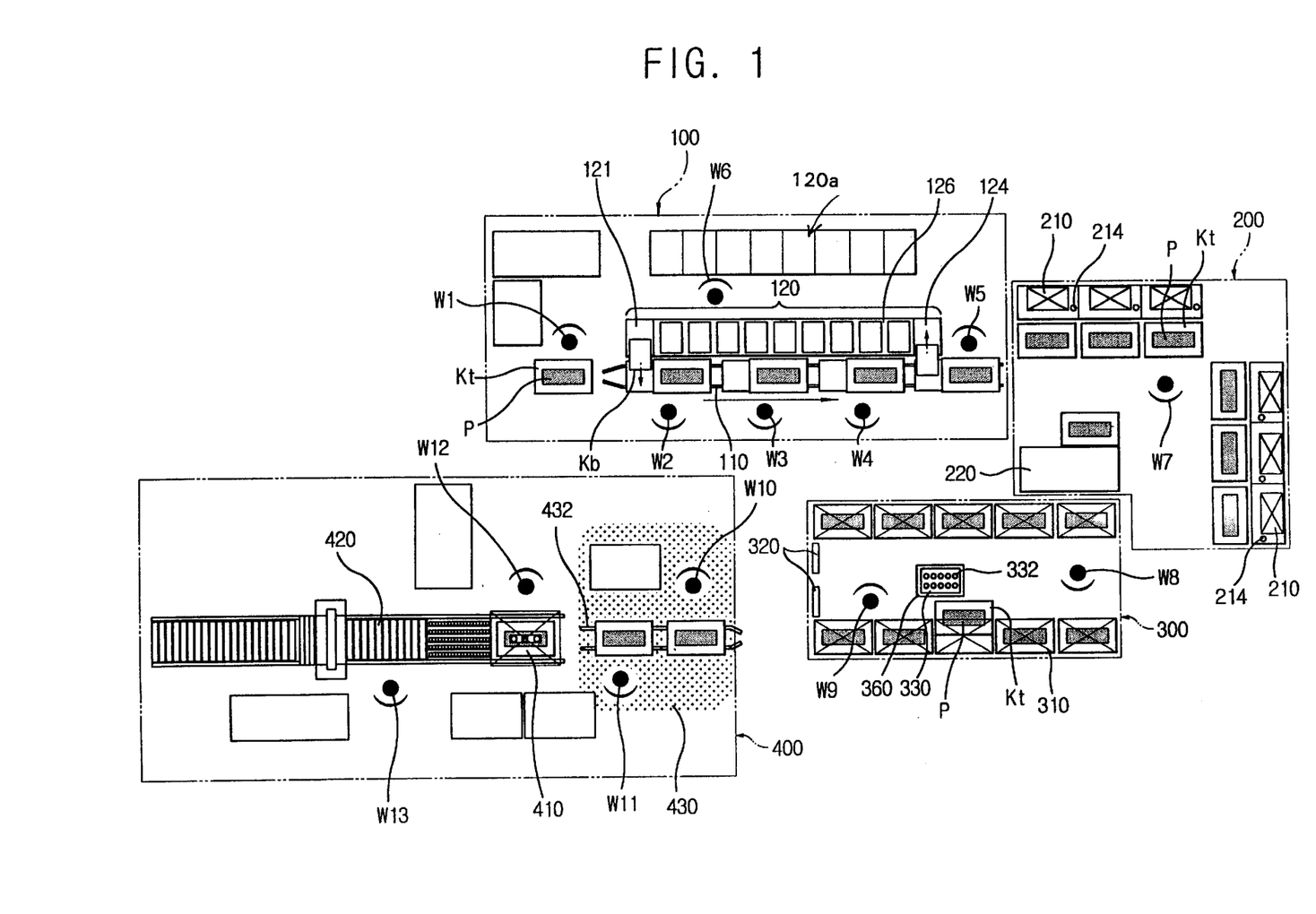
FIG. 1 is a plan view schematically showing a structure of assembly system according to the preferred embodiment of the present invention.

An assembly system of an outdoor unit of a dual-unit type air conditioner according to a preferred embodiment of the present invention is shown in FIGS. 1 to 7. FIG. 1 is a plan view for schematically showing a structure of the assembly system according to the preferred embodiment of the present invention, and FIGS. 2 to 7 are perspective views showing the respective sections of the assembly system according to the preferred embodiment of the present invention shown in FIG. 1.

The assembly system according to the preferred embodiment of the present invention shown in FIG. 1 has an assembly section 100 in which the outdoor unit P is initially assembled, a refrigerant charging section 200 in which the outdoor unit P is charged with the refrigerant, a testing section 300 in which the outdoor unit P goes through testing procedures, and a packaging section 400 in which the outdoor unit P is packaged and forwarded.

The assembled outdoor unit P is loaded on a cart Kt and goes through the assembling, refrigerant charging, and testing steps on the cart Kt, except for the packaging and forwarding step. The packaging and forwarding of outdoor unit P is carried out on a conveyor line.

Cart (Kt)

Figure 2:
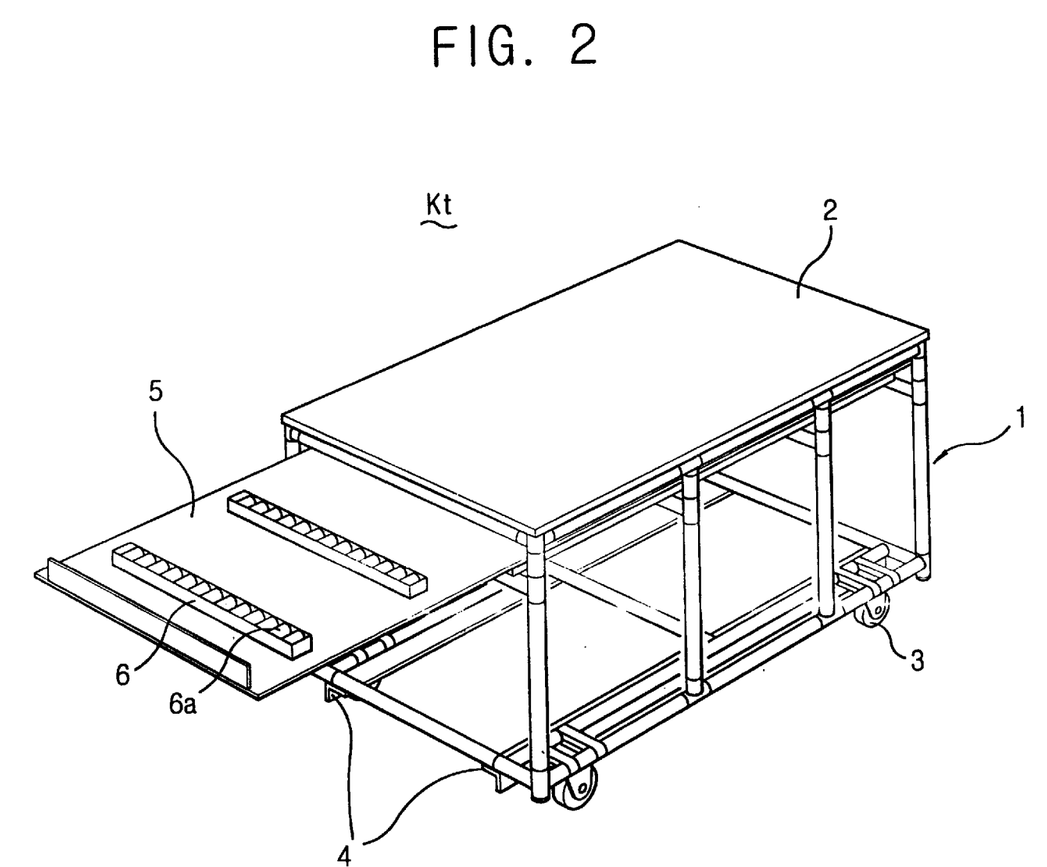
FIG. 2 is a perspective view showing a cart for conveying an outdoor unit which is assembled by the assembly system according to the preferred embodiment of the present invention as shown in FIG. 1.

As shown in FIG. 2, the cart Kt to be loaded with the outdoor unit P has a body 1, an oblong plate 2 disposed at an upper side of the body 1 to load the outdoor unit P, and wheels 3 installed at a lower end of the body 1. A pair of guide members 4 are installed at a lower portion of the body 1. The guide members 4 are spaced from each other in parallel relation with each other. A kit-box seat 5 is disposed below the oblong plate 2. The kit-box seat 5 is slidably moved inward and outward of the body 1, and has a pair of rails 6 disposed at an upper surface thereof. The rails 6 are perpendicularly arranged with respect to the guide members 4. A plurality of rollers 6a are disposed along the rails 6.

Assembly Section (100)

Figure 3:
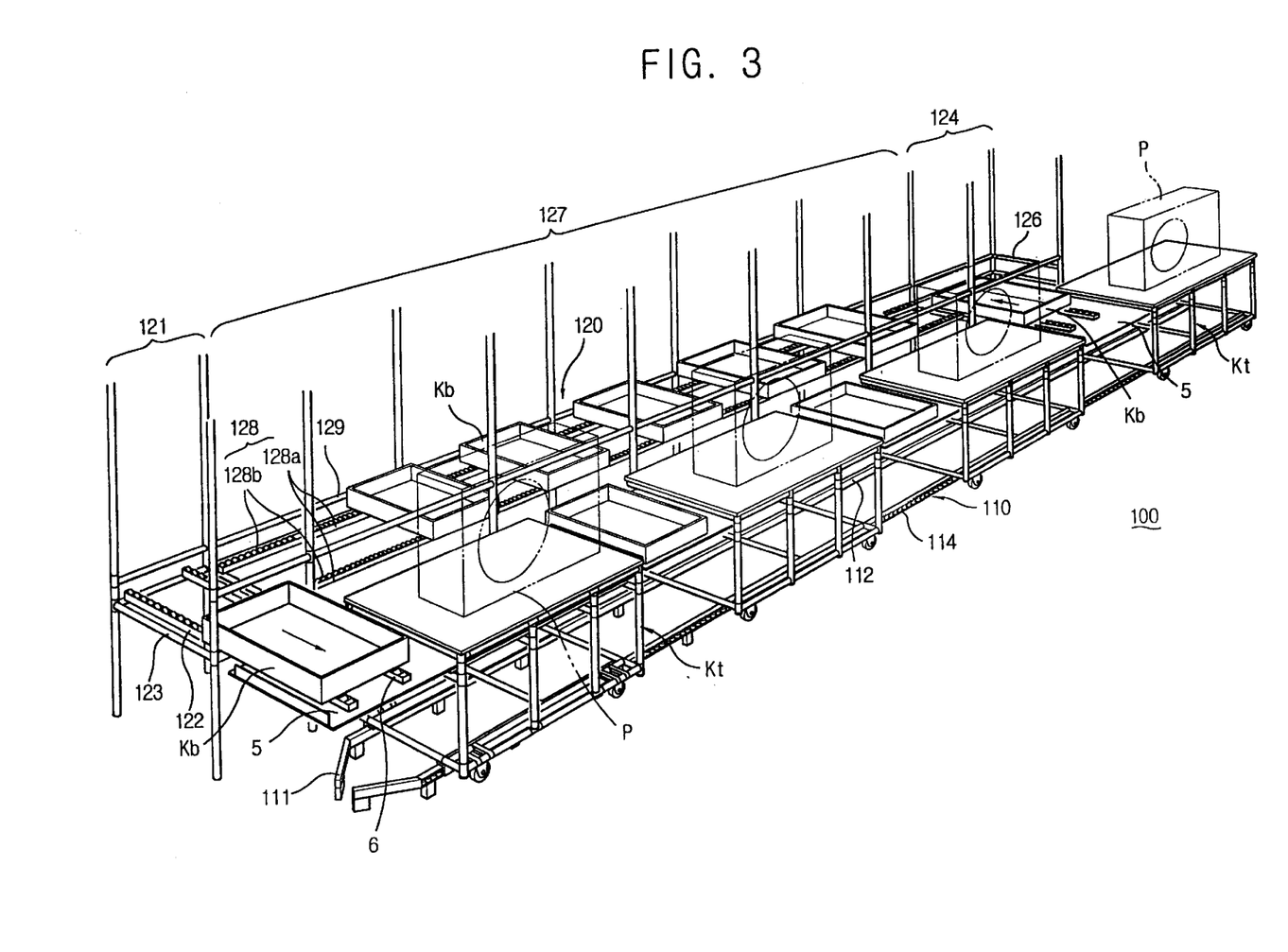
FIG. 3 is a perspective view showing an assembly section of FIG. 1.
Figure 4:
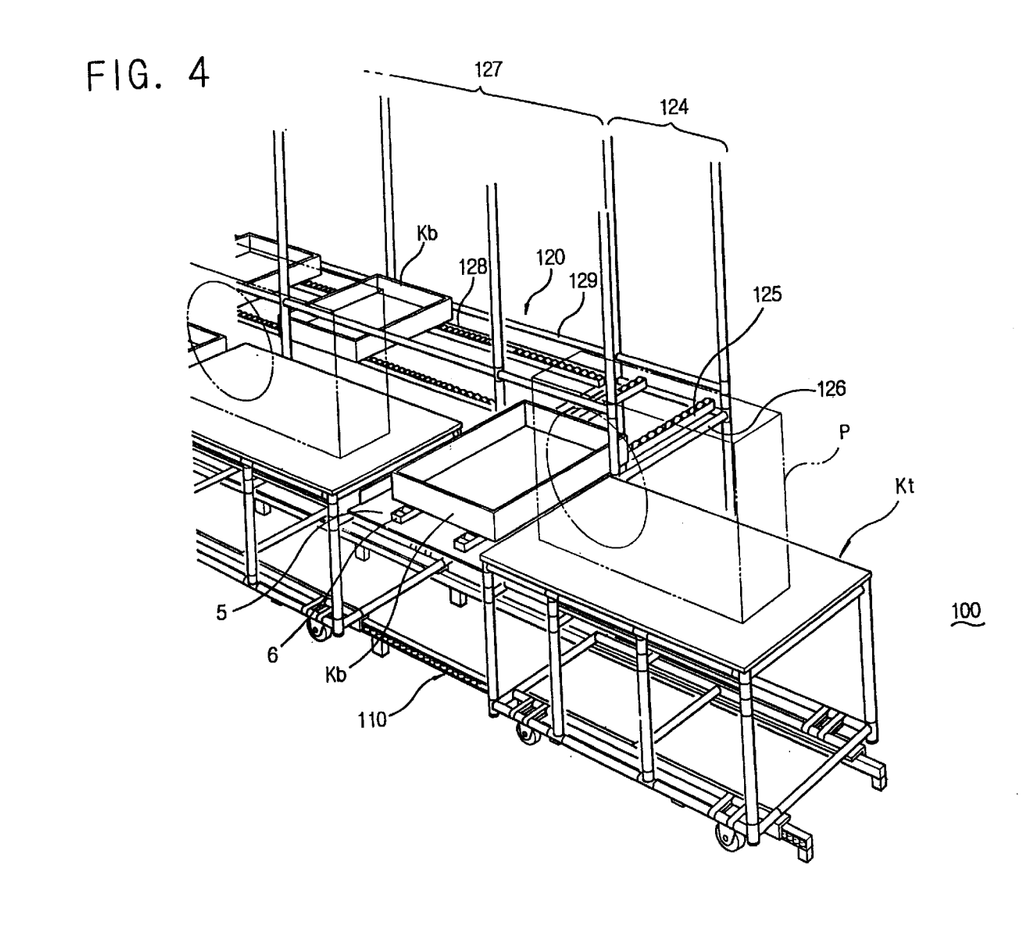
FIG. 4 is a perspective view showing the assembly section of FIG. 3 viewed from another direction.

The assembly section 100 in which the outdoor unit P is initially assembled is shown in FIGS. 3 and 4 in greater detail.

As shown in FIG. 3, the assembly section 100 has a guide rail 110 for guiding the cart Kt, and a kit-box input/output line 120 installed in parallel relation with the guide rail 110.

The guide rail 110 has a pair of rail members 112 which are spaced from each other by a predetermined distance and in parallel relation with each other. The predetermined distance between the respective rail members 112 is the same as the distance between the guide members 4 installed at the lower portions of the cart Kt. Additionally, a plurality of rollers 114 are disposed along the rail member 112 at an outer surface thereof. The rollers 114 provide for a smooth movement of the cart Kt when the cart Kt is guided along the guide rail 110.

Further, a front end section of the guide rail 110, i.e., an inputting side 111 is bent inward in order to provide for smooth inputting of the cart Kt.

Thus, when the cart Kt is inputted to the inputting side 111 of the guide rail 110, the pair of guide members 4 installed at the lower portion of the body 1 of the cart Kt come in contact with the rollers 114 disposed along the outer surface of the guide rail 110. In this situation, the workers W2, W3, or W4 pull or push the cart Kt so that the cart Kt is moved along the guide rail 110. Here, due to the presence of the rollers 114 disposed along the outer surface of the guide rail 110, the friction occurring between the guide rail 110 and the guide members 4 of the cart Kt is reduced. Thus, the cart Kt is moved with more convenience.

The kit-box input/output line 120 is for supplying to the cart Kt and withdrawing from the cart Kt the kit-boxes which are loaded with the air-conditioner parts (not shown). The kit-box input/output line 120 has an input section 121, a withdrawing section 124, and a conveying section 127.

The conveying section 127 has conveying rails 128 installed in parallel relation with the guide rails 110, and a support platform 129 for supporting the conveying rails 128 at the same height with the kit-box seat 5 of the cart Kt. The conveying rails 128 comprise a pair of rail members 128a and a plurality of rollers 128b. The support platform 129 is constructed with a plurality of assembling pipes.

The input section 121 and the withdrawing section 124 are installed at places adjacent to respective front and rear ends of the conveying section 127, i.e., to the inputting side 111 and withdrawing side of the guide rail 110. Like the construction of the conveying rails 128 of the conveying section 127, the input section 121 and the withdrawing section 124 respectively have an input rail 122 and a withdraw rail 125 which are installed at the same height with the kit-box seat 5 of the cart Kt, and support platforms 123 and 126 for supporting respective the input rail 122 and the withdraw rail 125. The input rail 122 and the withdraw rail 125 are installed in perpendicular relation with the conveying rail 128. The support platforms 123 and 126 are also constructed with a plurality of assembling pipes like the construction of the support platform 129 of the conveying section 127.

Refrigerant Charging Section (200)

Figure 5:
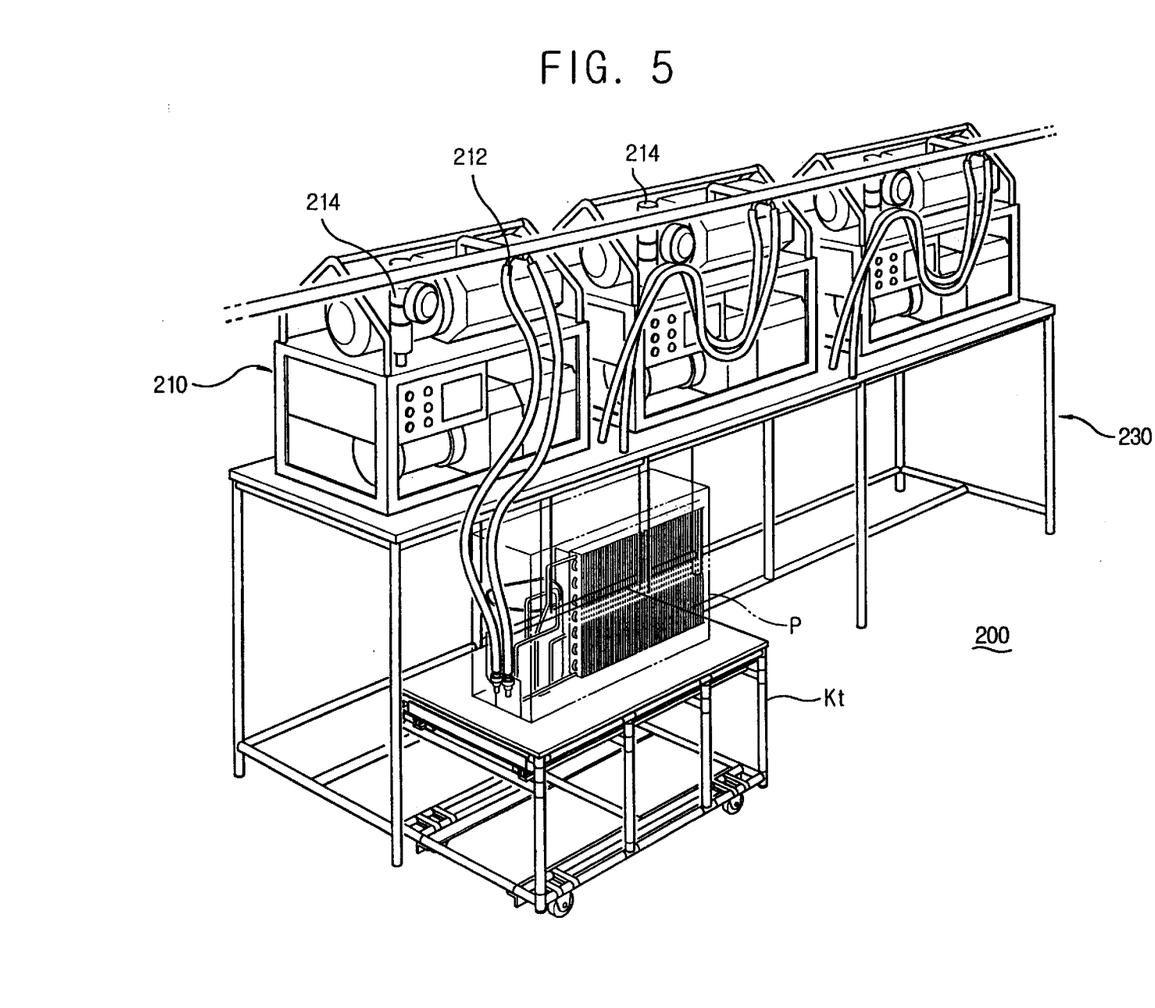
FIG. 5 is a perspective view showing a refrigerant charging section of FIG. 1.

FIG. 5 is a perspective view showing a main area of the refrigerant charging section 200 in which the outdoor unit P is charged with the refrigerant.

The refrigerant charging section 200 has six vacuum pumps 210, and one refrigerant charger 220 (not shown in FIG. 5). Three of the six vacuum pumps 210 are perpendicularly positioned with respect to the other three vacuum pumps 210 (see FIG. 1). Albeit such arrangement is suggested as the preferred embodiment of the present invention for the installation space reducing purpose, it is not limited to such arrangement but can be varied in accordance with the need of the manufacturer.

The vacuum pumps 210 vacuumize an inner space of the outdoor unit P before the refrigerant is charged into the outdoor unit P. Each of the vacuum pumps 210 has a pair of suction hoses 212 which are connected with the outdoor unit P.

In addition, each of the vacuum pumps 210 is provided with a timer (not shown) and an indicating lamp 214. The timer presets the operating time of the vacuum pumps 210. When the time preset to the timer is lapsed, the operation of the vacuum pumps 210 are stopped, and the indicating lamp 214 flickers to indicate that the operation of the vacuum pumps 210 are stopped.

Reference numeral 230 in FIG. 5 designates a support platform for supporting the vacuum pumps 210.

Testing Section (300)

Figure 6:
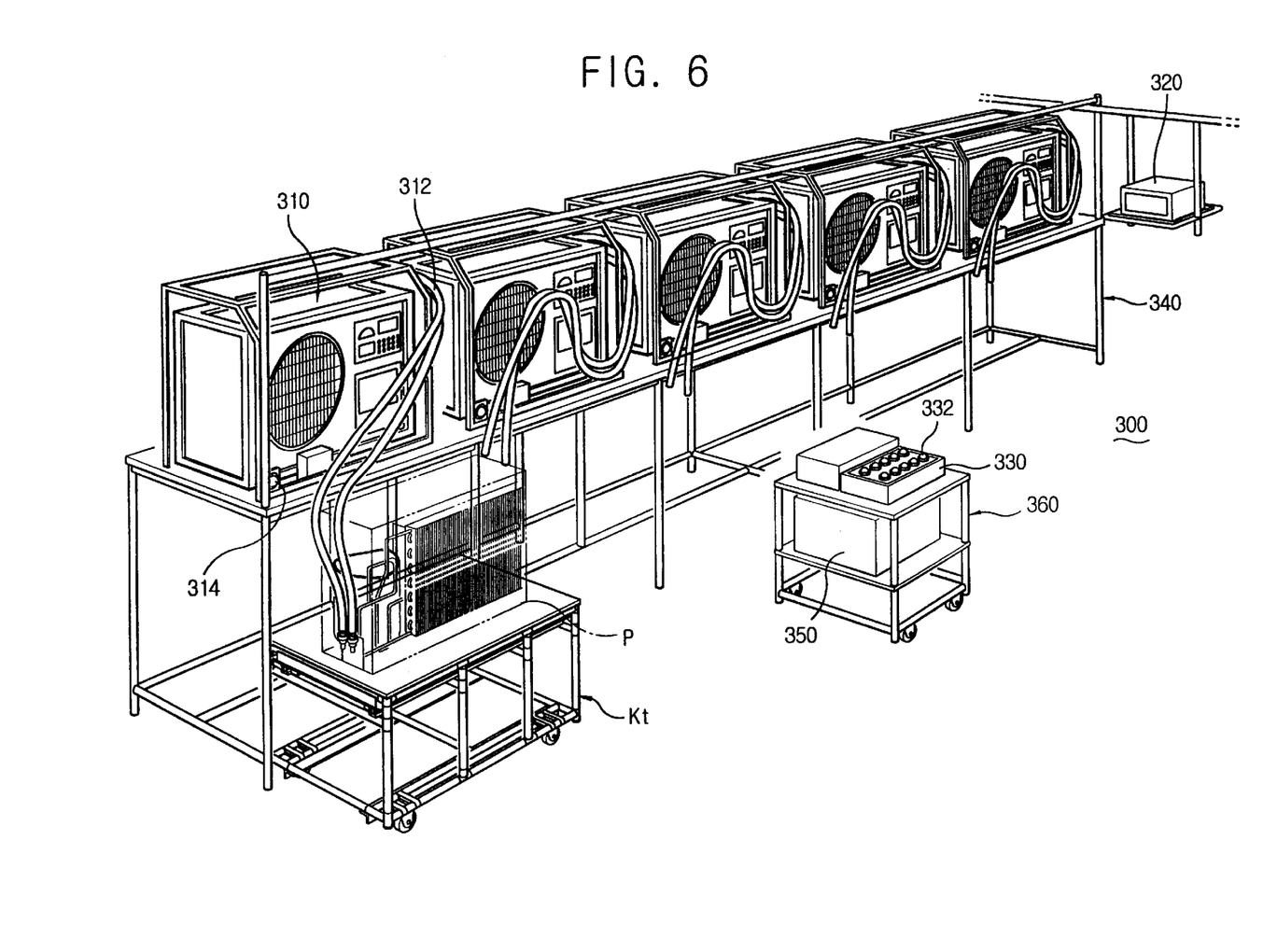
FIG. 6 is a perspective view showing a testing section of FIG. 1.

The testing section 300 on which the fully assembled outdoor unit P goes through the testing procedures is shown in FIG. 6 in greater detail.

As shown in FIG. 1, the testing section 300 is provided with ten dummy units 310 with five of the dummy units facing toward the other five dummy units 310 (see FIG. 1). FIG. 6 shows only five of the dummy units 310.

The dummy unit 310 serves as an indoor unit corresponding to the outdoor unit P so that the outdoor unit P can be operated. Simultaneously, the dummy unit 310 measures the electrical characteristics of the outdoor unit P such as electrical power consumption, etc. The dummy unit 310 has a socket for supplying an electricity to the outdoor unit P, and a pair of connecting hoses 312 connected to the outdoor unit P.

Additionally, the dummy unit 310 has a timer (not shown), and an indicating lamp 314. The timer and the indicating lamp 314 of the dummy unit 310 perform the same function as the timer and the indicating lamp 214 of the vacuum pump 210 of the refrigerant charging section 200.

Further, two displays 320 are disposed at a side of the testing section 300. The displays 320 display the results measured by the dummy unit 310. The displays 320 are electrically connected to a line of five dummy units 310, respectively. The results measured from the ten dummy units 310 are respectively displayed on the displays 320 one by one. That is, the results of two dummy units 310 are simultaneously shown on two displays 320 at a time.

A switching device 330 is disposed among dummy units 310 in order to select the dummy unit 31, whose results need to be displayed on a display 320. The switching device 330 has ten switches 332 correspond to ten dummy units 310. Thus, as the workers W8 or W9 select the switches 332, the results of the dummy units 310 corresponding to the selected switches 332 are transmitted to the displays 310.

In FIG. 6, the electric wires are not shown. The electric wires connect the dummy units 310, the outdoor unit P, the switching device 330, and the displays 320. A reference numeral 340 designates a support platform, 350 is a detection device for detecting the leakage of refrigerant, and 360 is a conveying cart for loading and conveying the switching device 330 and the detection device 350.

Packaging Section (400)

Figure 7:
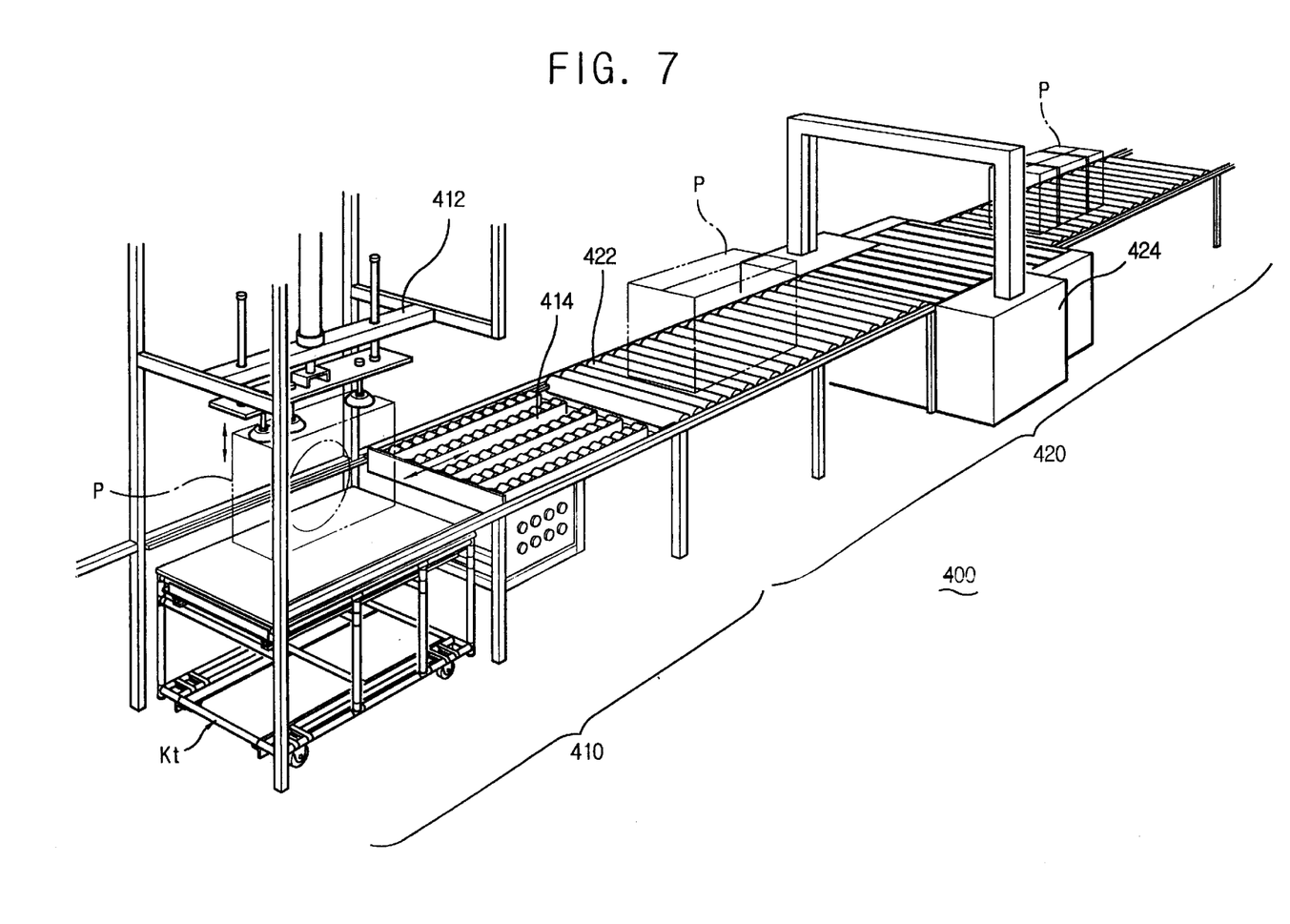
FIG. 7 is a perspective view showing a packaging section of FIG. 1.

As shown in FIG. 7 in greater detail, a packaging section 400 has a final assembly part (430 in FIG. 1, not shown in FIG. 7) in which the outdoor unit P is finally assembled, a packaging part 420 in which the fully assembled outdoor unit P is packaged, and a conveying part 410 on which the outdoor unit P is conveyed to the packaging part 420, and the cart Kt is withdrawn.

A guide rail 432 having the same structure as that of the assembly section 100 is provided to the final assembly section 430. Upper and lower cabinets are assembled at the final assembly part 430.

The outdoor unit P is conveyed by means of a roller conveyor 422 on the packaging part 420. A taping machine 424 is installed at an intermediate portion of the roller conveyor 422. No separate driving means is provided to the roller conveyor 422, but the products on the roller conveyor 422 are conveyed by the workers who push the products. It is preferable that a roller disposed at the roller conveyor 422 is a seat roller of synthetic resin so as to effectively prevent the generation of noise while the products are conveyed. The products are forwarded from an end of the roller conveyor 422.

The conveying part 410 has an elevating device 412 for elevating the outdoor unit P to a predetermined height, and a movable table 414 reciprocally moved between the packaging part 420 and the upper side of the cart Kt. The movable table 414 is moved by a cylinder (not shown) disposed at a lower portion thereof.

Method for Assembling the Indoor Unit (P)

Hereinbelow, the method for assembling the outdoor unit P by utilizing the above-described assembly system will be described.

Figure 8:
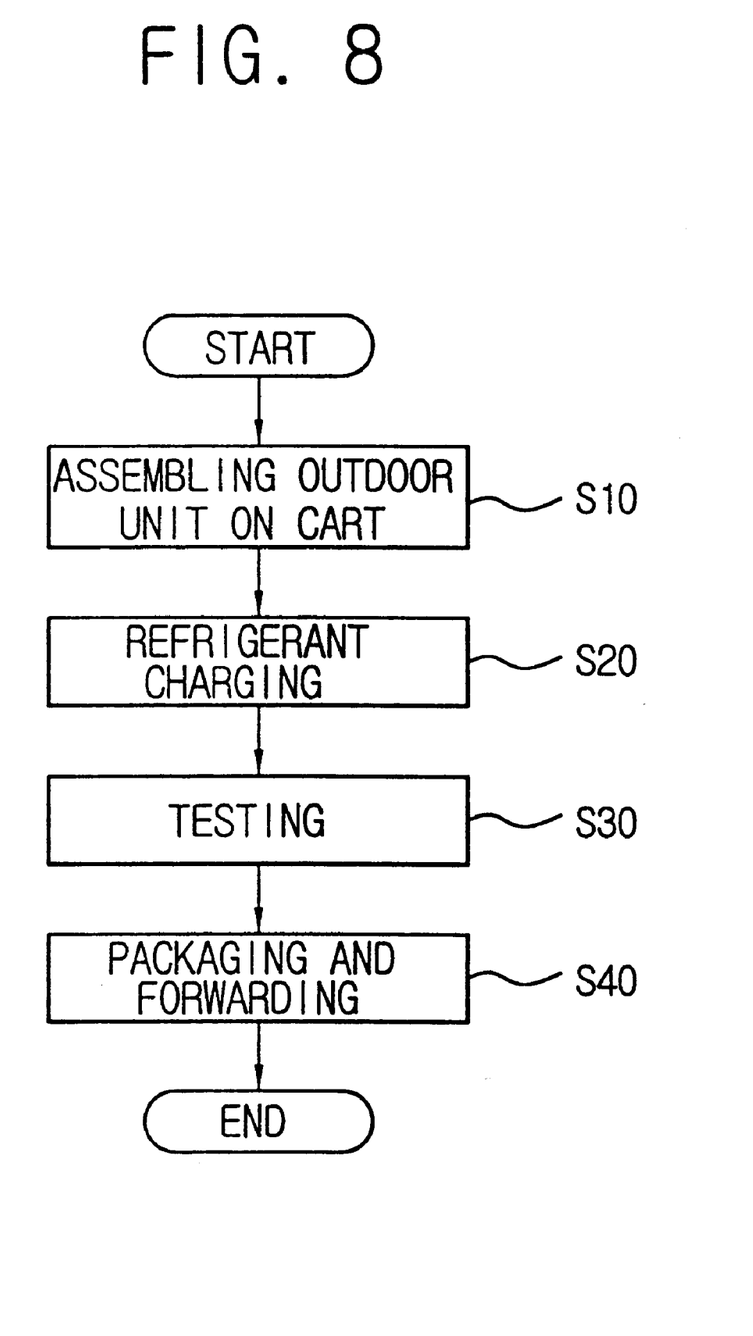
FIG. 8 is a flow chart for schematically illustrating a method for assembling an outdoor unit of a dual-unit type air conditioner according to the preferred embodiment of the present invention.

First, as schematically shown in FIG. 8, the method for assembling the outdoor unit P according to the preferred embodiment of the present invention has a step (S10) of assembling the outdoor unit P on the cart Kt, a step (S20) of charging the assembled outdoor unit P with the refrigerant, a step (S30) of performing the testings upon the outdoor unit P, and a step (S40) of packaging and forwarding the outdoor unit P.

The respective steps of the assembling method according to the preferred embodiment of the present invention will be described in greater detail hereinbelow.

Assembling Step (S10)

Based on FIGS. 1, 3, 4, and 9 (flow chart), the assembling step (S10) is described.

First, there are six workers W1 to W6 at the assembly section 100 on which the assembling step (S10) is executed.

Three workers W2, W3, and W4 are positioned along the guide rail 110, while one worker W1 is disposed in front of the inputting side 111 and one worker W5 is disposed in back of the output side section of the guide rail 110. Additionally, one worker W6 is positioned at the conveying section 127 of the kit-box input/output line 120.

Further, the parts of the outdoor unit P to be assembled are stored at storage areas 120a in back of the worker W6 positioned at the conveying section 127. Among the parts of the outdoor unit P, compressors and frames are stored around the worker W1 positioned in front of the guide rail 110.

Figure 9:
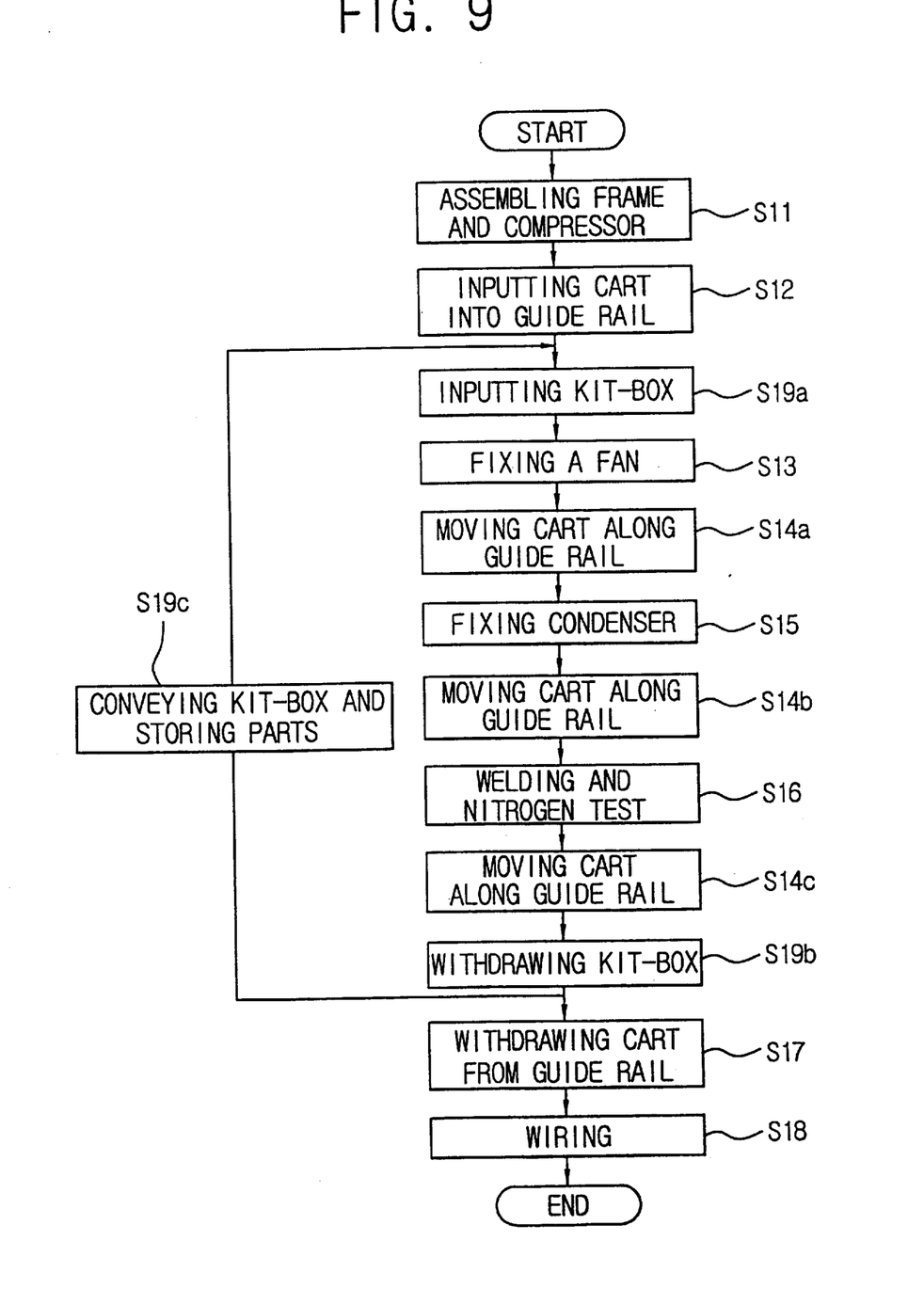
FIG. 9 is a flow chart for illustrating an assembling step of FIG. 8 in greater detail.

Thus, the worker W1 loads the frame and the compressor stored around him onto the cart Kt, and assembles the frame and the compressor (S11). Next, the worker W1 pushes the cart Kt to the inputting side 111 of the guide rail a 110 (S12). As the cart Kt is inputted to the inputting side 111 of the guide rail 110, another worker W2 positioned at the inputting side 111 of the guide rail 110 draws the kit-box seat 5 out of the body 1 of the cart Kt and aligns the kitbox seat 5 with the input section 121 of the kit-box conveying line 120. Then, the worker W2 pulls the kit-box Kb positioned at the input section 121 and inputs the kit-box Kb onto the kit-box seat 5 (S19a). In a state that the kit-box Kb is seated on the kit-box seat 5, the worker W2 installs the fan (S13). Then, along the guide rail 110, the cart Kt is moved to the next position where another worker W3 is waiting (S14a). The worker W3 fixes the condenser to the outdoor unit P (S15). When fixing the condenser (S15) is completed, the cart Kt is moved to another worker W4 along the guide rail 110 (S14b), where the condenser and the capillary tube are welded together, and a nitrogen test is performed (S16). When the Step (S16) is completed, the cart Kt is then guided along the guide rail 110 to the output side section of the guide rail 110 (S14c).

By the time the cart Kt is moved to the output side section of the guide rail 110, all parts of the outdoor unit P except for the cabinet are assembled. At this situation, the kit-box Kb seated on the kit-box seat 5 is empty. A worker W5 at the output side section of the guide rail 110 withdraws the empty kit-box Kb from the cart Kt to the withdrawing section 124 of the kit-box input/output line 120 (S19b). Then, the worker W5 checks the wiring condition of the outdoor unit P (S17). After the step (S17), the worker W5 withdraws the cart Kt from the guide rail 110 and hands over the cart Kt to the refrigerant charging section 200 (S18).

Meanwhile, the kit-box Kb withdrawn to the withdrawing section 124 of the kit-box input/output line 120 is conveyed along the conveying section 127 to the input section 121. In such situation, a worker W6 loads the parts stored at 120a in back of him onto the kit-box Kb conveyed along the conveying section 127 (S19c).

Refrigerant Charging Step (S20)

Figure 10:
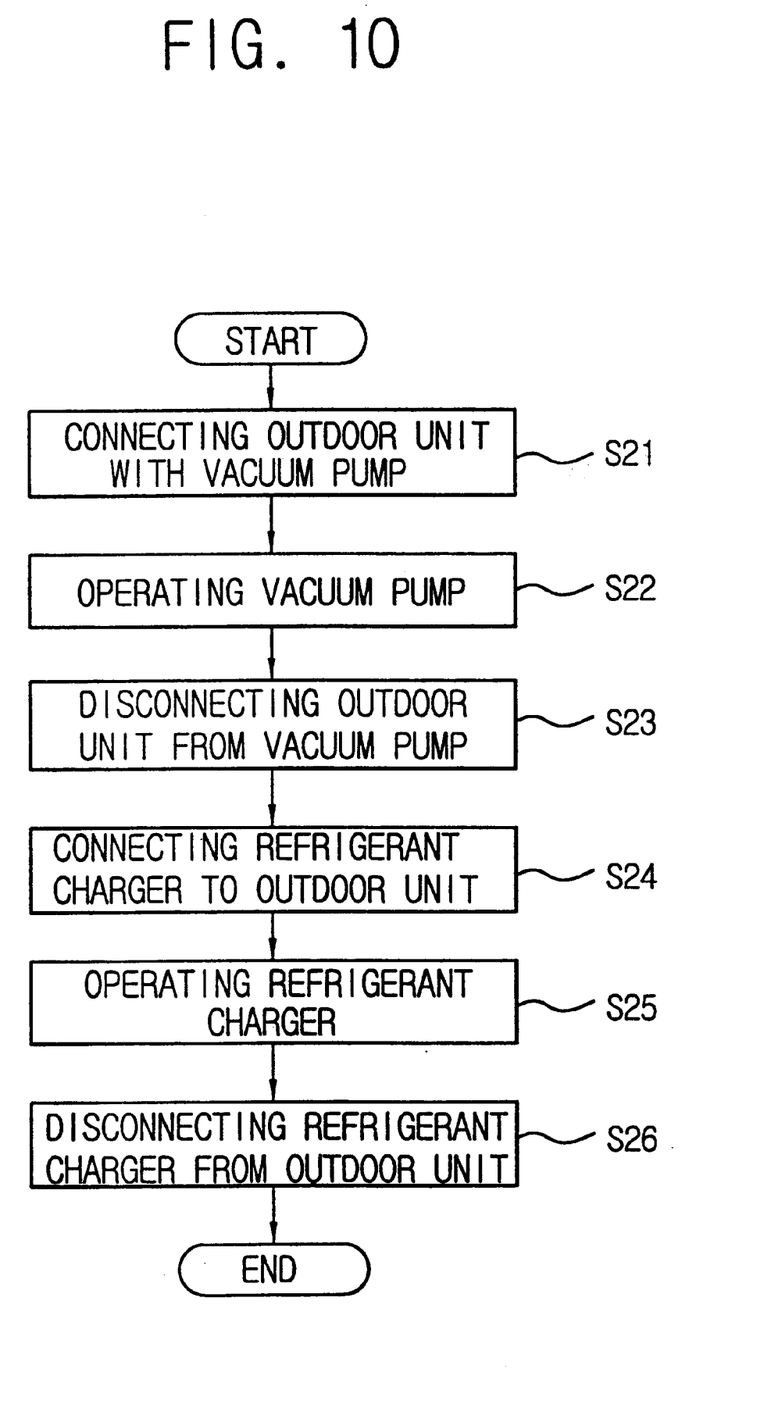
FIG. 10 is a flow chart for illustrating a refrigerant discharging step of FIG. 8 in greater detail.

FIG. 10 is a flow chart for explaining a refrigerant charging step.

As the cart Kt is withdrawn from the guide rail 110 of the assembly section 100, a worker W7 at the refrigerant charging section 200 receives the cart Kt. He then connects a non-operating one of the six vacuum pumps 210 to the outdoor unit P on the cart Kt by means of a suction hose 212 (S21). When the vacuum pump 210 is connected to the outdoor unit P, the worker W7 operates the vacuum pump 210 (S22) for a predetermined period of time preset by the timer (not shown) so that the interior of the outdoor unit P is vacuumized. It is preferable that the predetermined time is five minutes, and as the need arises, such as when the outdoor unit P is of a different model or different capacity, the operation time of the vacuum pump 210 can be varied by manipulating the timer.

While the vacuum pump 210 connected to the outdoor unit P is operated, the worker W7 performs the above procedure to another outdoor unit P withdrawn from the assembly section 100.

As the predetermined time is elapsed so that the operation of the vacuum pump 210 is over, the indicating lamp 214 flickers. The worker W7 disconnects the outdoor unit P from the vacuum pump 210 (S23), and connects the outdoor unit P to the refrigerant charger 220 (S24), and operates the refrigerant charger 220 so as to charge the refrigerant into the outdoor unit P (S25). When the refrigerant is charged, the outdoor unit P is disconnected from the refrigerant changer 220 (S26) and conveyed to the testing section 300. Here, the step of charging the refrigerant is performed in relatively shorter time in comparison with the operation time of the vacuum pump 210. Accordingly, one refrigerant charger 220 can correspond to the six vacuum pumps 210.

As described above, the refrigerant charging step is performed by one worker W7. Further, the outdoor units P conveyed from the assembly section 100 can be connected with any one of the six vacuum pumps 210 regardless of the order in which the outdoor units P are conveyed, and since the indicating lamp 214 provided to the vacuum pump 210 flickers when the operation of the vacuum pump 210 is over, the worker W7 is capable of performing his duty quickly with convenience.

Testing Step (S30)

Figure 11:
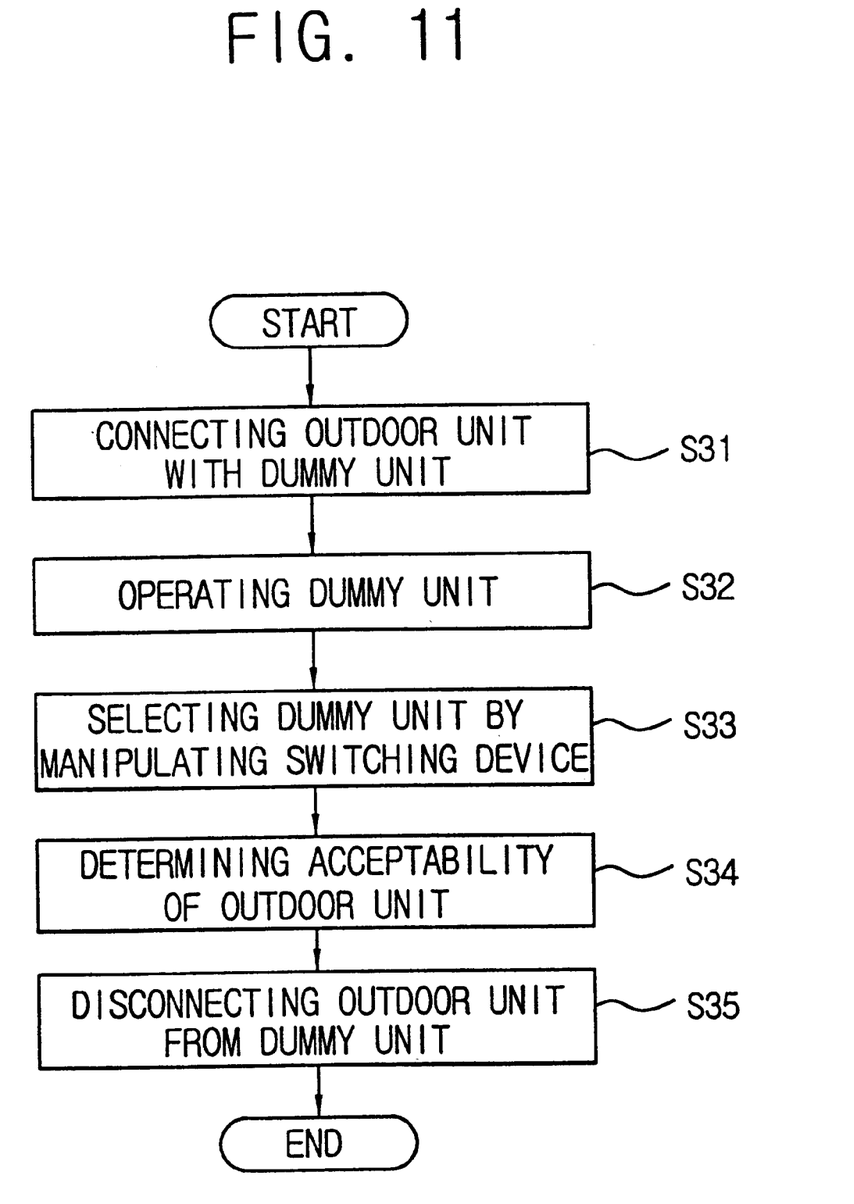
FIG. 11 is a flow chart for illustrating a testing step of FIG. 8 in greater detail.

FIG. 11 is a flow chart for explaining a testing step (S30) in detail.

As shown in FIG. 11, as the cart Kt is conveyed from the refrigerant charging section 200, a worker W8 or W9 connects the outdoor unit P loaded on the cart Kt to one non-operating dummy unit 310 of the ten dummy units 310 (S31). Next, the dummy unit 310 is operated for a predetermined time (eight minutes is preferable) which is preset in the timer (not shown), together with the outdoor unit P (S32). In such situation, the dummy unit 310 measures the characteristics of the outdoor unit P such as the power consumption.

As the predetermined time is elapsed, the indicating lamp 314 attached to the dummy unit 310 flickers. Watching the indicating lamp 314 flickering, the worker W8 or W9 selects a switch 332 corresponding to the dummy unit 310 whose indicating lamp 314 is flickering and manipulates the switch 332 of a switching device 330 (S33). Then, the results of the outdoor unit P measured by the dummy unit 310 which is selected by the switch 332 are displayed on a display 320. The worker W8 or W9 determines whether the outdoor unit P is acceptable or not by the results displayed on the display 320 (S34). The outdoor unit P which has passed the testing step is disconnected from the dummy unit 310 (S35), and the outdoor unit P determined as acceptable is conveyed to the packaging section 400 while still loaded on the cart Kt.

Like the refrigerant charging section, during the testing step (S30), since the worker W8 or W9 observes the indicating lamp 314 which is flickering upon completion of the operation of the dummy unit 310 as the predetermined time set to the timer is elapsed, the worker W8 or W9 easily performs the testing step (S30) regardless of the order in which the outdoor units P are conveyed from the refrigerant charging section 200. That is, the worker W8 or W9 may connect any outdoor unit P to any dummy unit 310.

Further, since the results detected by the ten dummy units 310 are displayed by twos on the two displaying device 320, there is no need to install separate displays for the respective dummy units 310.

Meanwhile, in FIG. 6, the switching device 330 is on one portion of the conveying cart 360, while a detection device 350 for detecting the leakage of refrigerant of the outdoor unit P is mounted on another portion of the conveying cart 360. Accordingly, after the next outdoor unit P is connected to a dummy unit 310, the worker W8 or W9 moves the conveying cart 360 close to that outdoor unit P and performs the refrigerant leakage detection by means of the detection device 350.

Packaging and Forwarding Step (S40)

The outdoor unit P which has passed the testing step (S30) is conveyed to a packaging section 400. A worker W19 or W11 at a final assembly part 430 fixes a cabinet to the outdoor unit P, so that the outdoor unit P is fully assembled (S41).

Figure 12:
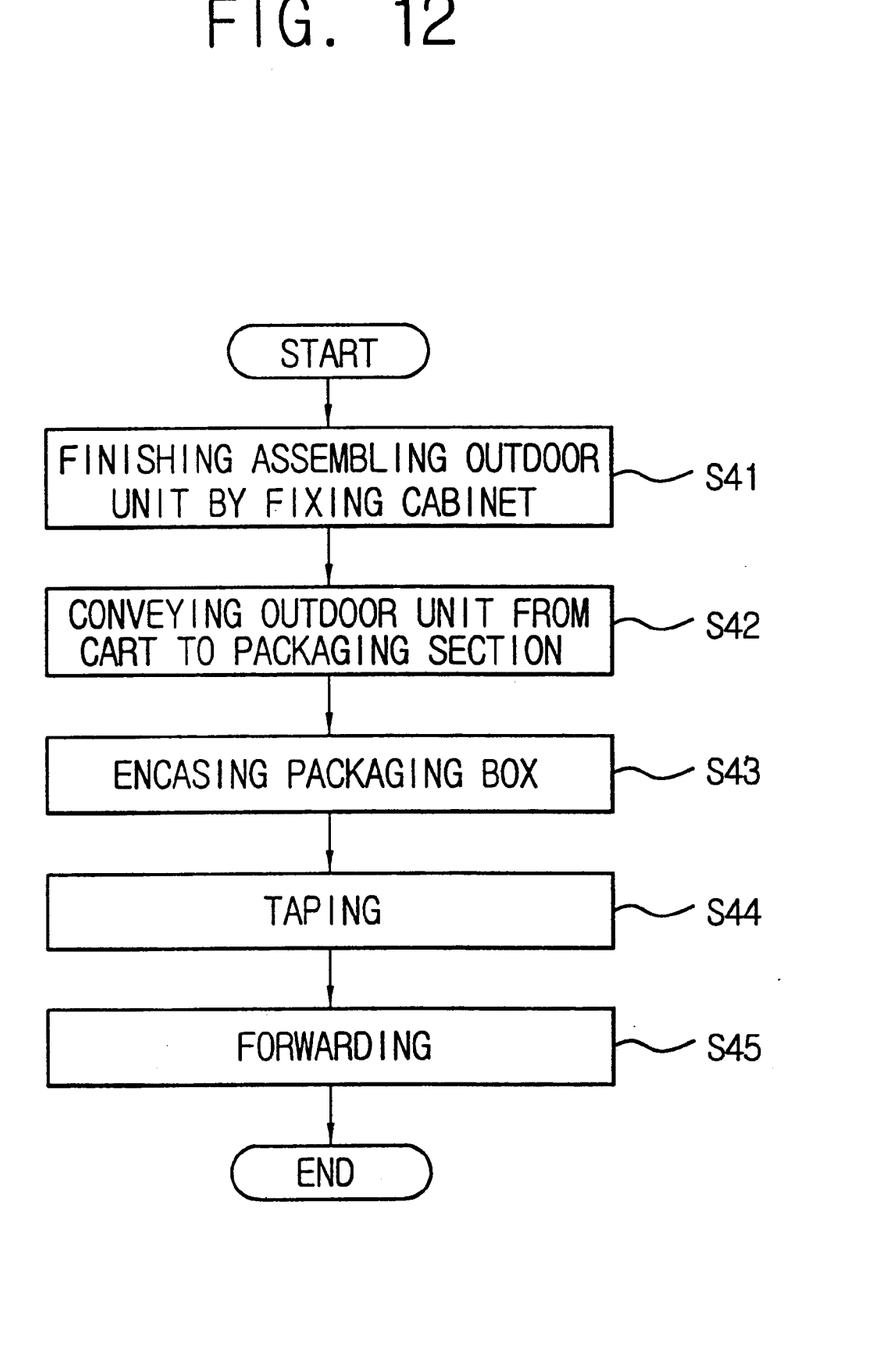
FIG. 12 is a flow chart for illustrating a packaging and a forwarding step of FIG. 8 in greater detail.

The fully assembled outdoor unit P is moved to the conveying part 410, and conveyed from the cart Kt to the packaging part 420 (S42). The outdoor unit P conveyed to the packaging part 420 is then packaged while a worker W13 there encases the outdoor unit P with a package box (S43). A taping machine 424 performs taping procedure (S44), and the outdoor unit P is forwarded (S45). FIG. 12 is a flow chart for illustrating above processes.

Hereinbelow, the operation of the conveying part 410 is described in greater detail. (Refer to FIG. 7 and FIG. 13)

Figure 13:
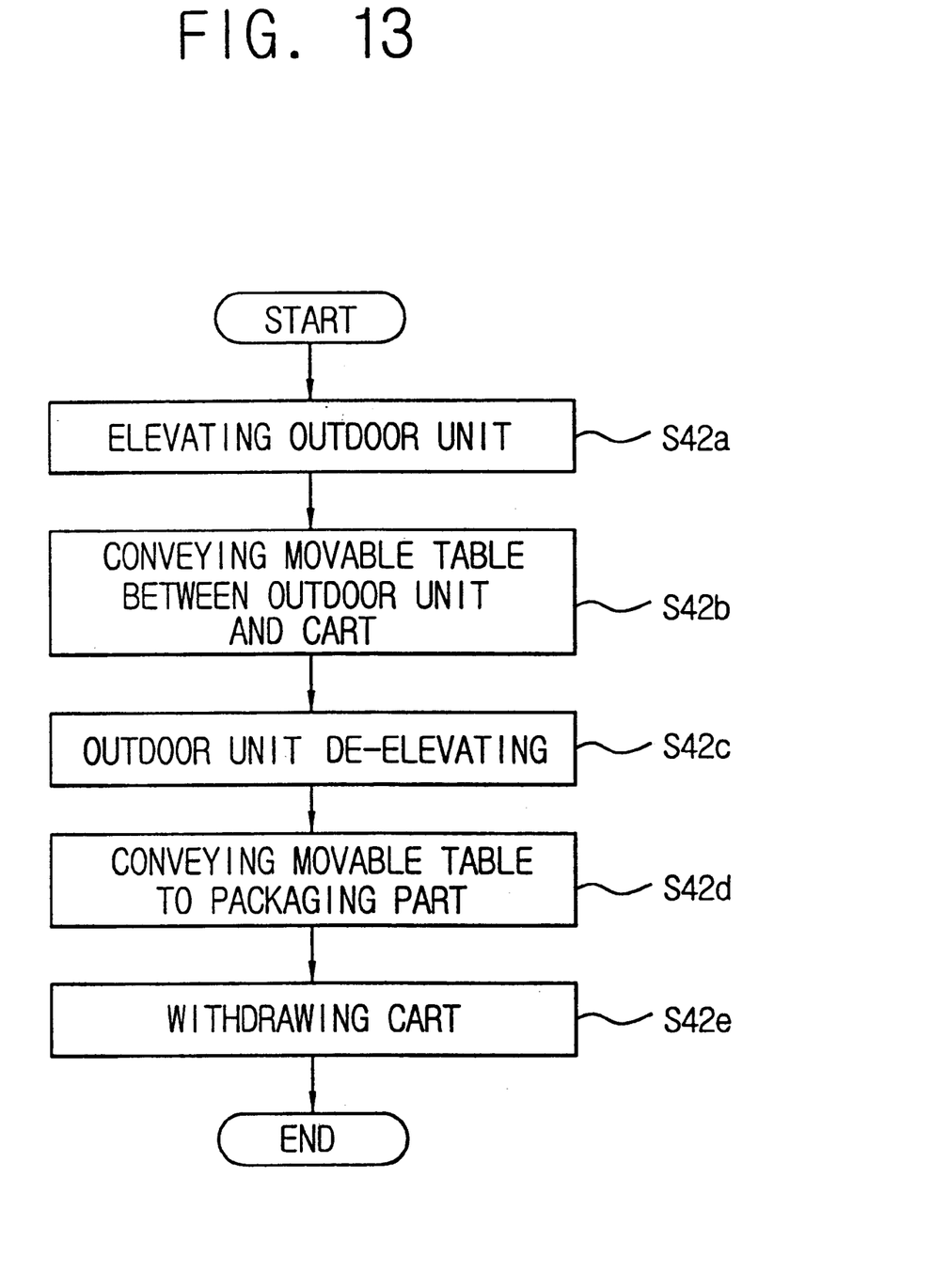
FIG. 13 is a flow chart for illustrating a conveying step of FIG. 12 in greater detail.

As the cart Kt loaded with the outdoor unit P is conveyed to a position beneath an elevating device 412, the outdoor unit P is elevated by the elevating device 412 (S42a). Once the outdoor unit P has been elevated, the movable table 414 positioned at a side of the packaging part 420 is moved to a place between the outdoor unit P and the cart Kt, so that the movable table 414 is positioned beneath the outdoor unit P (S42b). Then, a worker W12 encases a lower portion of the outdoor unit P with a cushion and a lower portion packaging box. Then, the worker W12 manipulates the elevating device 412, so that the elevating device 412 lowers the outdoor unit P downward onto an upper side of the movable table 414 (S42c). The movable table 414 loaded with the outdoor unit P is then conveyed to the roller conveyor 422 of the packaging part 420 (S42d). Then, the worker W12 pushes the outdoor unit P loaded on the movable table 414 toward the packaging part 420, and the conveyance of the outdoor unit P is completed.

As described above, the assembly system of the present invention employs a cart so that it does not require the mechanical nor electrical conveyor belt of the types used in the prior art. Accordingly, financial investments and maintenance expenses for equipment are substantially reduced. Further, according to the present invention, when the manufacturer needs to vary the products he produces, since the manufacturer simply has to change the types of parts supplied to the cart, it is convenient to produce a variety of products, and no more equipment altering is required. Accordingly, productivity in comparison with the amount of investment is much improved, and versatility of the products is also improved so that the manufacturer is enabled to vary the model and quantity of the products.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method of assembling an outdoor unit of a dual-unit type air conditioner, comprising the steps of:
   (A) assembling an outdoor unit on a mobile cart;
   (B) charging a refrigerant into a fully assembled outdoor unit while on the cart;
   (C) testing the outdoor unit finished in the step (B) while the outdoor unit is on the cart by moving the outdoor unit to a stationary dummy indoor air conditioning unit, connecting the outdoor unit to the dummy indoor unit, operating the indoor and outdoor units, and moving the outdoor unit away from the indoor unit; and
   (D) packaging and forwarding the outdoor unit finished in the step (C).

2. The method as claimed in claim 1, wherein the step (A) comprises the sub-steps of:
   (A1) assembling a frame and a compressor together;
   (A2) inputting the cart to a cart-input section of a guide rail;
   (A3) fixing a fan to the outdoor unit;
   (A4) fixing a condenser to the outdoor unit;
   (A5) welding the condenser to a capillary tube and performing a nitrogen test;
   (A6) withdrawing the cart from the guide rail; and
   (A7) installing electric wires on the outdoor unit.

3. The method as claimed in claim 2, wherein the step (A) further comprises the sub-steps of:
   (A8) storing various parts to be assembled into a kit-box;
   (A9) inputting the kit-box stored with the parts to the cart after the step A2 and before the step (A3);
   (A10) withdrawing an empty kit-box from the cart before the step (A6); and
   (A11) returning the withdrawn kit-box to the cart-input section of the guide rail.

4. The method as claimed in claim 1, wherein the step (B) comprises the sub-steps of:
   (B1) connecting the outdoor unit to a vacuum pump;
   (B2) operating the vacuum pump to vacuum the outdoor unit;
   (B3) disconnecting the outdoor unit from the vacuum pump;
   (B4) connecting a refrigerant charger to the outdoor unit;
   (B5) operating the refrigerant charger to charge the outdoor unit with refrigerant; and
   (B6) disconnecting the refrigerant charger from the outdoor unit.

5. The method as claimed in claim 1, wherein the step (C) comprises the sub-steps of:
   (C1) connecting the outdoor unit to a dummy unit;
   (C2) operating the dummy unit;
   (C3) selecting a switch of a switching device corresponding to the outdoor unit whose quality needs to be displayed on a display;
   (C4) determining the acceptability of the outdoor unit through measured results displayed on the display; and
   (C5) disconnecting the dummy unit from the outdoor unit.

6. The method as claimed in claim 1, wherein the step (D) comprises the sub-steps of:
   (D1) conveying the outdoor unit from the cart to a packaging part;
   (D2) encasing the outdoor unit in a packaging box;
   (D3) taping the outdoor unit encased in the packaging box; and
   (D4) forwarding the fully packaged outdoor unit.

7. The method as claimed in claim 6, wherein the step (D) further comprises the sub-step of completing assembling of the outdoor unit by fixing a cabinet to the outdoor unit before the step (D1).

8. The method as claimed in claim 6, wherein the step (D1) comprises the sub-steps of:
   (i) elevating the outdoor unit from the cart;
   (ii) encasing a lower portion of the elevated outdoor unit with a cushion and with a lower portion packaging box;
   (iii) positioning a movable table between the elevated outdoor unit and the cart;

(iv) lowering the outdoor unit onto an upper surface of the movable table; and (v) conveying the movable table to the packaging part.

9. The method as claimed in claim 1, wherein the step (A) further includes engaging a stationary first guide with a secondary second guide disposed on the cart for guiding the cart as the outdoor unit is assembled.

10. The method as claimed in claim 1, wherein step (A) further includes inserting a kit box onto the cart at a cart entrance end of assembly section, assembling components from the kit box to form the outdoor unit on the cart as the cart moves toward an exit end of the assembly section, removing the kit box at the cart exit end and conveying the kit box back to the cart entrance end in a direction parallel to a direction of travel of the cart from the cart entrance end to the cart exit end.

* * * * *